UNITED STATES PATENT OFFICE.

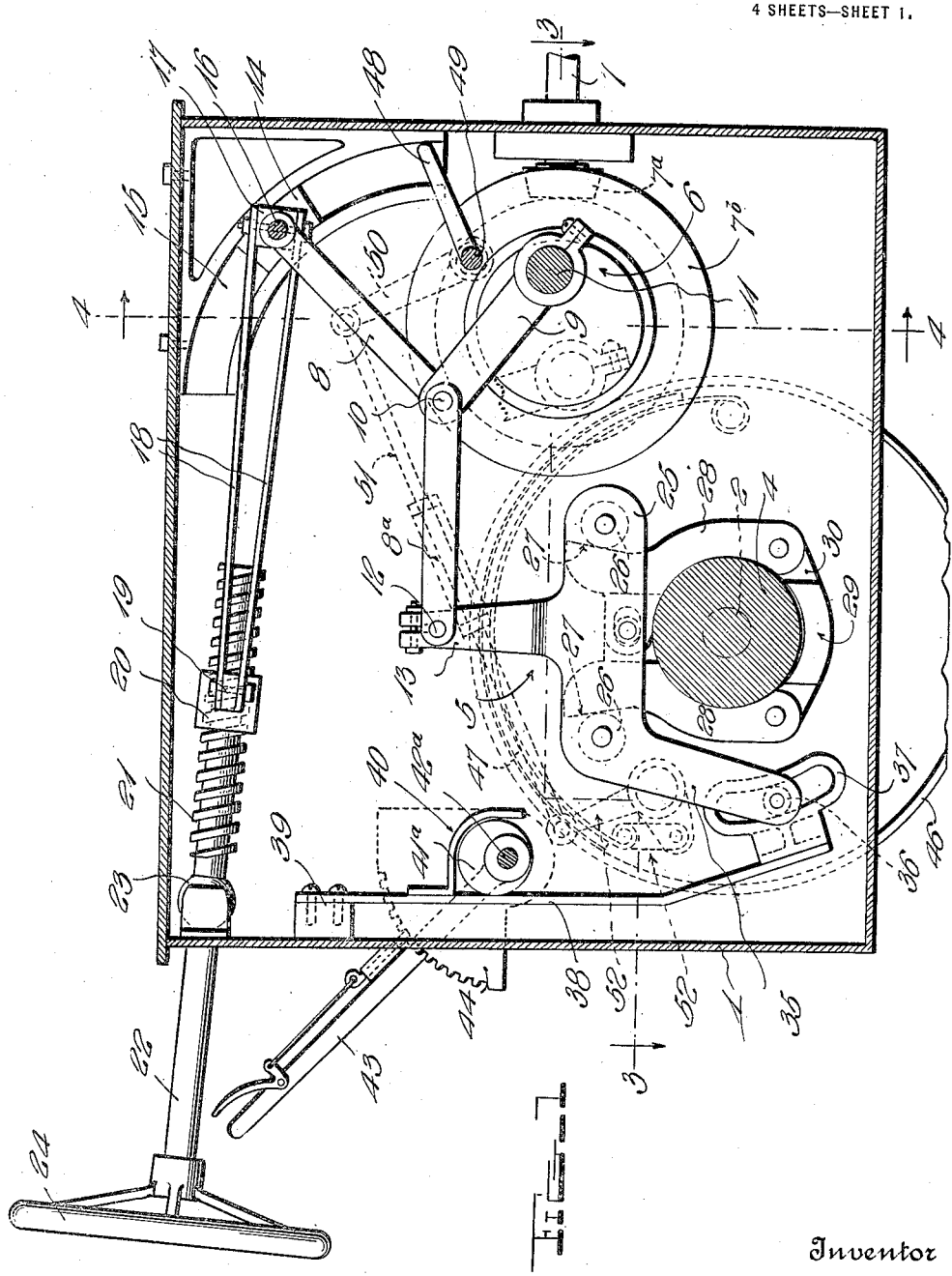

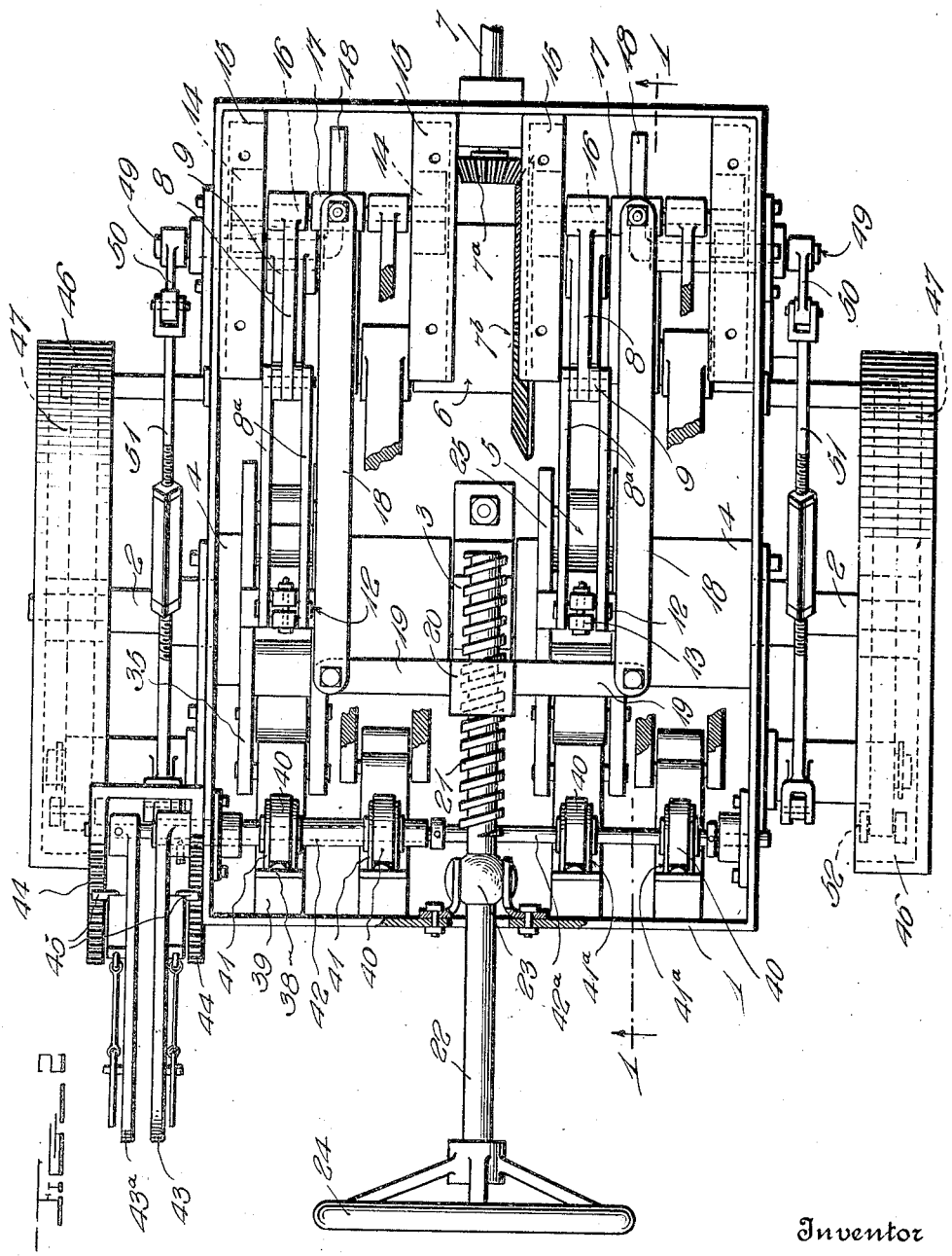

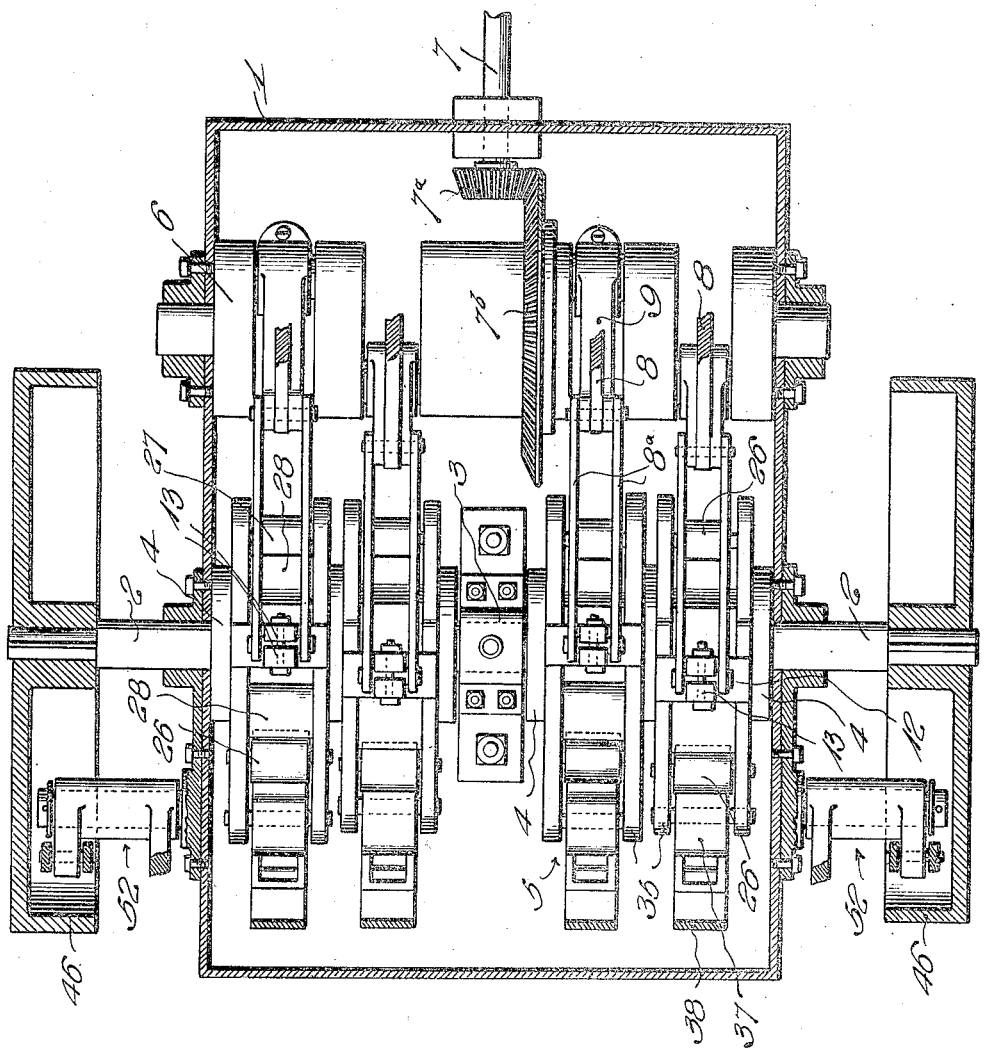

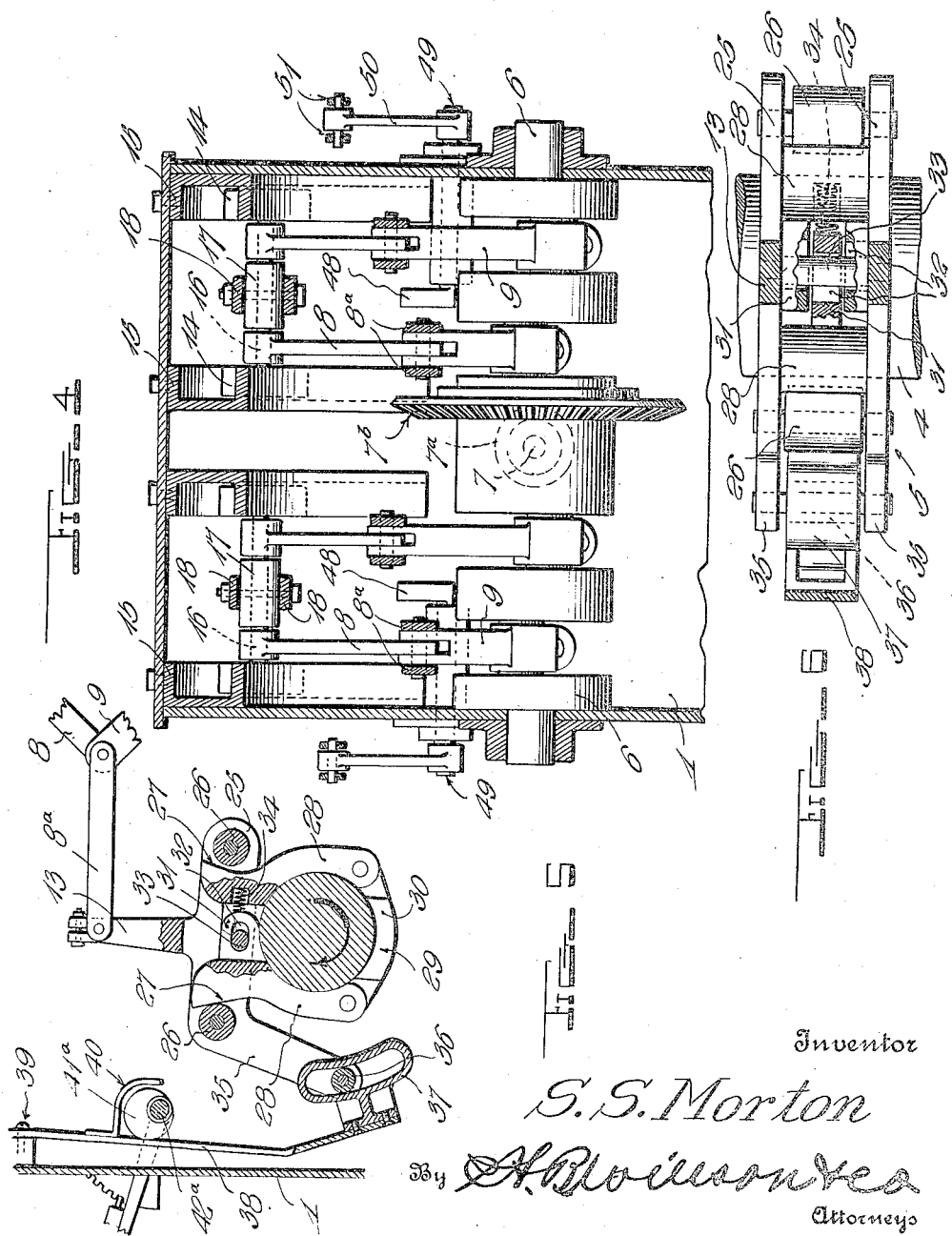

SAMUEL STEPHEN MORTON, OF HARRISBURG, PENNSYLVANIA.

TRANSMISSION MECHANISM.

1,423,008. Specification of Letters Patent. Patented July 18, 1922.

Application filed September 25, 1920. Serial No. 412,740.

*To all whom it may concern:*

Be it known that I, SAMUEL S. MORTON, a citizen of the United States, residing at Harrisburg, in the county of Dauphin and State of Pennsylvania, have invented certain new and useful Improvements in Transmission Mechanisms; and I do declare the following to be a full, clear, and exact description of the invention such as will enable others skilled in the art to which it appertains to make and use the same.

My invention relates to the transmission of power and more particularly to transmission mechanisms designed primarily for use upon tractors and like machines, although adapted also for other purposes.

One object of the invention is to provide an arrangement of transmission parts and a common control therefor, which will permit the right and left-hand traction wheels or endless treads of a tractor or the like, to be driven at the same speed for driving straight forwardly or rearwardly, at different speeds for ordinary steering, and in opposite direction for abrupt turning.

A further object is to provide a transmission by whose use the ordinary clutch and speed changing gears may be dispensed with, while at the same time permitting the machine to be stopped and started, and increased or decreased in speed without any pause whatever in the transmission of power.

Another object is to provide an arrangement of toggle links and operating means therefor, for actuating intermittent grip devices by means of which the driving shaft is rotated. In this connection, a further aim is to make novel provision for varying the strokes of the toggle links, whereby to correspondingly vary the movement of the intermittent grip devices, thereby controlling the speed of the shaft.

A still further object of the invention is to provide a novel braking mechanism which is automatically brought into play when the toggle links are shifted to an idle position.

An additional object is to provide a pair of levers for setting the driving units of the right and left hand traction members for either forward or reverse driving, said levers being positioned in close proximity to each other, so that they may be moved in the same direction by one hand, when both driving units are to be set for driving in the same direction.

With the foregoing and minor objects in view, the invention resides in the novel construction and combination of parts hereinafter described and claimed, the descriptive matter being supplemented by the accompanying drawings.

Figure 1 is a longitudinal sectional view of the transmission mechanism constructed in accordance with my invention, this view being cut approximately on the line 1—1 of Fig. 2, Figure 2 is a top plan view with parts in horizontal section, the cover plate of the transmission casing being removed.

Figure 3 is a horizontal sectional view cut approximately on the line 3—3 of Fig. 1.

Figure 4 is a vertical transverse section as designated by line 4—4 of Fig. 1.

Figure 5 is a detail vertical section with parts in elevation, showing more particularly the construction and operation of one of the intermittent grip devices.

Figure 6 is a top plan view partly in horizontal section showing one of the intermittent grip devices.

This application is a continuation in part of my United States application Serial No. 323709, filed Sept. 15, 1919 and my United States application No. 381883 which was filed on or about May 17, 1920, the latter application being divisional of the first. In the present application, several of the features of construction disclosed in the previous applications, are retained, but a general simplification and reorganization of parts has been carried out, producing a transmission mechanism possessing the same advantages as the old mechanisms, with the additional advantages of simplicity, ease of manufacture, and light weight.

In the present showing, all of the transmission parts, with the exception of the hand controls, are located within an oil-tight casing 1 which is adapted principally for mounting on the frame of a tractor or like machine, but it will be understood that the invention is not restricted to use in this particular field. A pair of axially alined shaft sections 2 extend across the casing and have their inner ends jointly mounted in an appropriate bearing 3, the portions of said shafts between the bearing 3 and the sides of the casing, being enlarged as at 4 to form a pair of drums upon which a plurality of intermittent grip devices 5 operate.

Separate driving units are provided for the two shafts 2 and each of these units preferably includes two of the grip devices 5. Novel provision is made whereby these devices may be oscillated for driving the two shafts at the same speed either forwardly or reversely, for driving said shafts at different speeds in the same direction, and for driving them at a wide range of speeds, the lowest of which will propel a tractor or the like with great pulling power, at a pace greatly reduced below that which can be attained with any of the transmission mechanism now in common use. From this slow speed, it is possible to jump to a higher speed without any jerk whatever, and during the speed changing adjustments, there is no lull whatever in the transmission of power to the right and left-hand driving wheels or other traction members, such as endless treads. These several advantages are attained by the combination and arrangement of parts described below.

A crank shaft 6 extends across the casing 1 parallel with the shaft sections 2 and may be driven by an appropriate motor through the instrumentality of any suitable driving connection. In the present instance, I have shown a shaft 7 which may lead directly from an engine shaft without the inclusion of any clutch or transmission gears, said shaft 7 having a driving pinion $7^a$ which meshes with a gear $7^b$ on the shaft 6, said pinion and gear being by preference located within the casing 1 in order that they may be effectively lubricated. All of the intermittent grip devices 5 are operated from the crank shaft 6, by means of front and rear toggle links 8 and $8^a$, and connecting rods 9. The toggle links 8 and $8^a$ are pivoted to each other at their meeting ends as shown at 10 and the connecting rods 9 are mounted at one end on these pivots, while at their opposite ends, said connecting rods are mounted on the crank pins 11 of the crank shaft 6. The rear ends of the links $8^a$ are pivoted at 12 to upstanding lever arms 13 of the intermittent grip devices 5 and the outer ends of the links 8 include shoes 14 which are movable along curved tracks 15 in the upper part of the casing 1. The toggle links 8 and $8^a$ are continually oscillated at their pivotally connected ends by means of the connecting rods 9 and the crank shaft 6, but when the shoes 14 are adjusted along the tracks 15 to such an extent as to bring the links 8 and $8^a$ into substantial alignment with each other, the aforesaid oscillation of said links will move the pivots 12 only a negligible amount which is insufficient to operate the intermittent grip devices 5, with the result that the two shaft sections 2 then remain at a standstill. As the shoes 14 are advanced along the tracks 15, to decrease the angles between the front and rear toggle links 8 and $8^a$, the strokes of the connecting rods 9 serve to straighten this angle and the rear ends of the links $8^a$ are thus caused to stroke a greater amount, the length of stroke being controlled entirely by the position of the shoes 14 on the tracks 15. It will thus be seen that by properly adjusting the shoes, the toggle links 8 and $8^a$ may be made to oscillate the intermittent grip devices 5 for driving the shaft sections 2 either slowly or rapidly, or at any one of a number of intermittent speeds.

The two front links 8 of each of the driving units are preferably connected by a transverse pin 16, the two pins being here shown passing through blocks 17 which are pivotally connected with the front ends of longitudinal controlling links 18, whose rear ends are pivoted to a cross arm 19. This cross arm may be moved toward and from the tracks 15 on a straight line for the purpose of simultaneously increasing or decreasing the speed of both shaft sections 2, to the same extent. The cross arm in question may also be swung transversely of the aforesaid line to simultaneously move the shoes 14 in opposite directions along the tracks 15, so that the two transmission units are simultaneously set for driving the two shaft sections 2 at different speeds in the same direction. Any appropriate master control may be employed for operating the cross arm 19 in this manner, but I prefer that said arm shall be provided with a central nut 20 in which the coarsely threaded front end 21 of a control shaft 22 is threaded. Shaft 22 extends through the upper portion of the casing 1 and between its ends is mounted on an appropriate ball joint 23, which joint permits rotation of the shaft to shift the cross arm 19 either forwardly or rearwardly, and lateral swinging of said shaft to swing the cross arm in the manner above set forth. To conveniently operate the shaft 22 in the necessary manner, its rear end is provided with a hand wheel 24 but other provision for operating said shaft may well be made.

The intermittent grip devices 5 are of such nature that they may be adjusted for driving the drums 4 and their shaft sections 2 either forwardly or rearwardly and novel provision is made for setting said intermittent grip devices either at neutral points or for driving in one direction or the other. Before the operation of this setting means may be fully understood, it will be necessary to briefly set forth the construction of the grip devices in question. All of these devices are of the same construction and hence only one will be described and the descriptive matter thereof may be read more particularly on Figs. 1 and 5. The lever arm 13 rises from a horizontally elongated head 25 whose ends carry a pair of rollers 26 which are co-operable with cam surfaces 27 on the endmost links 28 of a linked flexible band 29 which surrounds the drum 4, said band including the two substantially parallel links 28 and a connecting link 30. At their free ends, the links 28 are provided with inwardly extending overlapping ears 31 which are provided with slots 32 through which a pin 33 extends loosely, said pin being carried by the head 25. A coil spring or the like 34 may normally exert its tension against one of the ears 31 to open the friction band 29 so that it will not grip the drum, even though it may be oscillated. In order to cause the aforesaid band 29 to grip the drum when turned in one direction, it is necessary to first shift the head 25 endwise in one direction or the other, and hold it in such shifted position as shown for instance in Fig. 5. This brings the several links 28 and 30 into contact with the drum so that the action of the toggle links on the lever arm 13 will tightly contract the band around the drum when said lever arm is moved in one direction, but will release said band when the arm in question is moved in the opposite direction. During the working strokes of the device 5, the head 25 turns to a slight extent on the pivot pin 33, thereby bringing one of the rollers 23 into engagement with the adjacent cam surface 27 to crowd the link 28 carrying this surface into tight engagement with the shaft, outward movement of the other link 28 being in the meantime prevented by contact of the pin 33 with the end wall of the slots 32 of said other link. During movement of the lever arm 13 in the other direction, that is on the idle strokes of the device 5, the roller 26 rides down the cam surface 27 and releases the band 29 to turn freely on the drum.

As above set forth, in order that the intermittent grip device 5 may operate to rotate the drum 4 in either direction, it is necessary that the head 25 shall be shifted in one direction or the other. For shifting this head, novel provision is made. One end of the head is provided with a depending arm 35 whose free end carries a shoe 36 receivable in an arcuate track or guide 37 which is concentric with the drum 4. Each one of the tracks 37 is provided with an individual carrying spring 38, the several springs being rigidly mounted at their upper ends as indicated at 39 and having stirrups 40 at suitable points. As shown for instance in Fig. 2, the two stirrups 40 of one driving unit of the machine receive cams 41 on a tubular shaft 42, while the stirrups 40 of the other driving unit receive similar cams 41$^a$ on another shaft 42$^a$ which passes rotatably through and beyond the tubular shaft 42. By rotating the two shafts 42 and 42$^a$ in unison in the same direction, all of the intermittent grip devices 5 will be simultaneously set for driving in one direction. If the shafts in question are turned simultaneously in the opposite direction, the intermittent grip devices 5 will be set for reversing, while turning one shaft in one direction and the other shaft in the opposite direction, will set one unit of the transmission mechanism for forward driving and the other unit thereof for driving reversely. It will be observed, by reference to Figs. 1 and 5, that whenever one of the cams 41 or 41$^a$ is turned by its respective shaft, the spring 38 is shifted in one direction or the other to bodily move its track 37, thereby pulling on the shoe 36 and on the arm 35 carrying said shoe, with the result that the head 25 is moved in one direction or the other to place the intermittent grip device in condition for operation.

Any suitable provision may be made for turning the shafts 42 and 42$^a$ as required, but as a simple and convenient means of obtaining this end, I have shown the outer ends of said shafts provided with hand levers 43 and 43$^a$ which are positioned side by side so that they may both be grasped by one hand of the operator to adjust all of the cams simultaneously in the same manner. However, by turning one lever in one direction and one in the other, the cams may be adjusted in reverse directions. I have shown appropriate segments 44 and pawls 45 for holding the levers 43 and 43$^a$ in adjusted position, but other locking means could be employed if desired, and in some instances friction may be relied upon.

The shaft sections 2 may if desired be provided with brake drums 46 with which appropriate brake shoes 47 coact, and novel provision is made for applying said shoes to the drums or for applying any other brake means used, when the shoes 14 are moved to points at which the toggle links 8 and 8$^a$ are idle, that is, at points at which said links are set so that they will not oscillate the intermittent grip devices 5 to such an extent as to cause turning of the drums 4. In the present showing, brake operating devices 48 are positioned to be struck by the shoes 14 or rather by the blocks 17 between said shoes, said operating devices being here shown in the form of arms extending rigidly from rock shafts 49 which extend through the sides of the casing. At their outer ends, the shafts 49 carry crank arms 50 which are connected by appropriate rods 51 with any desired or well known link and lever mechanism 52 for applying the brakes. By the arrangement described, when the transmission mechanism is brought to a neutral point, the brakes will be simultaneously applied.

Assuming that the invention is installed on a tractor provided with endless treads, the operation is as follows: The moment the engine is cranked, the crank shaft 6 starts rotating and consequently the links 8 and 8ª are oscillated, but the shoes 14 are then at the lower ends of the tracks 15 so that the links 8 and 8ª are substantially in alignment, with the result that they produce no appreciable stroking of the lever arms 13. Even if these arms should be moved to and fro a slight extent, the gripping devices 5 would not become operative until their respective cams 41—41ª were properly set. When the levers 43 are operated to shift the heads 25 forwardly or rearwardly as required, the grip devices 5 are placed in condition for driving either forwardly or reversely as occasion may demand, and when the wheel 24 is now rotated to cause the shaft 22 and nut 20 to pull rearwardly on the cross arm 19 and the links 18, the shoes 14 are advanced toward the upper ends of the tracks 15. The result is that the links 8 and 8ª are angled so that the stroking of the connecting rods 9 causes considerable movement of the lever arms 13 with the result that the intermittent grip devices 5 alternately turn the drums 4 and return idly on said drums. The amount which the devices 5 are oscillated may be increased by moving the shoes 14 toward the upper ends of the tracks 15 and may be correspondingly decreased by moving said shoes in the opposite direction and even though a great number of different speeds may be attained, there is no possibility whatever of any jerk when shifting from one speed to another, since in making this shift, all of the intermediate speed positions are passed through. Furthermore, there is no pause or lull in the driving of the shafts 2 while shifting from one speed to another, this being of great advantage when pulling a dead load such as a plow or other earthworking instrument, in which no momentum is ever imparted to the load. When the shoes 14 are forced entirely to the lower ends of the tracks 15, the links 8 and 8ª are set at idle positions and simultaneously the arms 48 are operated to apply the brakes.

Whenever it is desired to steer the machine rather gradually, the shaft 22 is merely swung to the right or left as required, with the result that the cross arm 19 and the links 18 move the shoes 14 of one driving unit downwardly upon the tracks, while the corresponding shoes of the other unit are moved upwardly. The result of this, is that the speed of one endless tread is increased while the other is correspondingly decreased, thus causing the machine to travel on an arc having a comparatively large radius. The further the shaft 22 is swung to the side, the more abrupt will be the turning of the machine, and if a direct turn is required, without any forward or reverse movement of the machine, this may be effected by moving the levers 43 and 43ª to set the two driving units in such a manner as to drive one of the endless treads forwardly while the other is driven rearwardly. During this operation, the speeds of the two driving units may be controlled by shifting the shoes 14 along the tracks 15.

From the foregoing, taken in connection with the accompanying drawings, it will be seen that I have greatly simplified the construction disclosed in the applications above referred to, and that a highly efficient and desirable transmission mechanism has been provided, which mechanism possesses a great number of advantages over transmissions now in use. Some of these advantages are: elimination of clutch and speed changing gears; gradual shift from low to high or from high to low without any pause in the driving power transmitted to the traction members; changing of speeds without any jerk whatever, steering by driving one traction member in the same direction as the other but at different speed; sharp turning by driving the two traction members in reverse directions; speed-changing and steering by means of a single master control; operation of a brake mechanism by said master control; connecting the intermittent grip devices with and releasing them from the drums at will; and control of all of these devices in some instances by one hand of the operator, simply by grasping the two levers 43 and 43ª.

Since excellent results are obtainable from the general construction and combination shown, I prefer that it shall be followed, but within the scope of the invention as claimed, numerous changes may well be made.

I claim:

1. In combination, two driving units adapted for positive anti-slipping connection with right and left-hand traction members, each unit being of positive-drive anti-slipping nature throughout and being adjustable for different speeds without pause in their positive anti-slipping driving; and limitaneously movable setting means operable by a single master control for setting said units at a single operation to simultaneously accelerate one unit and decrease the speed of the other unit.

2. In combination, a pair of transmission units, a member connected with both units, a control shaft having threaded connection with said member, and means mounting said shaft for both rotation and swinging.

3. In combination, a pair of transmission units, a cross arm linked at its ends to said units respectively, said cross arm having a nut between its ends, a control shaft threaded through said nut, and means mounting said shaft for both rotation and swinging.

4. In combination, a pair of transmission units, a member connected with both units, a control shaft having threaded connection with said member, said shaft having a balllike enlargement, and a fixed socket in which said enlargement is mounted to permit both rotation and swinging of said shaft.

5. In a transmission mechanism, two separate driving units for connection respectively to right and left hand traction members; each unit comprising a drum, an intermittent grip device on said drum, a curved track transverse to and spaced from said drum, and power actuated toggle links connected with said grip device for operating the same, one of said toggle links thrusting against said track; means for adjusting said one link of each unit along said track to vary the stroke of its respective grip device, and means for setting the grip device of either unit for forward or rearward driving.

6. In a transmission mechanism, two separate driving units for connection respectively to right and left hand traction members; each unit comprising a drum, an intermittent grip device on said drum, a curved track transverse to and spaced from said drum, and power actuated toggle links connected with said grip device for operating the same, one of said toggle links thrusting against said track; and a master control for said one link of both units connected therewith for moving both links either oppositely or in the same direction.

7. In a transmission mechanism, two separate driving units for connection respectively to right and left hand traction members; each unit comprising a drum, an intermittent grip device on said drum, a curved track transverse to and spaced from said drum, and power actuated toggle links connected with said grip device for operating the same, one of said toggle links thrusting against said track; a cross arm connected with said one link of both units, and means for moving said cross arm either on a straight line toward and from the tracks, or for swinging said cross arm transversely of such line.

8. In a transmission mechanism, two separate driving units for connection respectively to right and left hand traction members; each unit comprising a drum, an intermittent grip device on said drum, a curved track transverse to and spaced from said drum, and power actuated toggle links connected with said grip device for operating the same, one of said toggle links thrusting against said track; a cross arm connected with said one link of both units, and a movably mounted shaft carrying said cross arm and mounted for moving said arm either on a straight line toward or from the tracks, or for swinging said cross arm transversely of such line.

9. In a transmission mechanism two separate driving units for connection respectively to right and left hand traction members; each unit comprising a drum, an intermittent grip device on said drum, a curved track transverse to and spaced from said drum, and power actuated toggle links connected with said grip device for operating the same, one of said toggle links thrusting against said track; a cross arm connected with said one link of both units, a nut carried by said cross arm, and a control shaft threaded through said nut, said shaft being mounted for both rotation and swinging.

10. In a transmission, a casing, a transverse driven crank shaft extending across said casing, two alined shaft sections extending into said casing parallel with said crank shaft, a pair of curved tracks mounted in said casing and extending transversely of said crank shaft, a pair of intermittent grip devices on said shaft sections, two pairs of toggle links connected at one end with said grip devices respectively, the other ends of said toggle links having shoes mounted on said tracks, means for adjusting said shoes along said tracks, and connecting rods extending between said links and said crank shaft.

11. In a transmission, a casing, a transverse driven crank shaft extending across said casing, two alined shaft sections extending into said casing parallel with said crank shaft, a pair of curved tracks mounted in said casing and extending transversely of said crank shaft, a pair of intermittent grip devices on said shaft sections, two pairs of toggle links operated by said crank shaft, said toggle links being connected at one end with said grip devices respectively, the other ends of said toggle links having shoes mounted on said tracks, a pair of control links pivoted to and extending from said shoes respectively, a cross arm to which said control links are pivoted, and means for moving said cross arm to and from said tracks on a straight line or for swinging said cross arm transversely of such line.

12. In a transmission, a casing, a transverse driven crank shaft extending across said casing, two alined shaft sections extending into said casing parallel with said crank shaft, a pair of curved tracks mounted in said casing and extending transversely of said crank shaft, a pair of intermittent grip devices on said shaft sections, two pairs of toggle links operated by said crank shaft, said toggle links being connected at one end with said grip devices respectively, the other ends of said toggle links having shoes mounted on said tracks, a pair of control links pivoted to and extending from said shoes respectively, a cross arm to which said control links are pivoted, a nut on said arm, a control shaft threaded in said nut and extending to the exterior of the casing, and means mounting said control shaft for rotation and swinging.

13. A structure as specified in claim 10, together with means for setting said grip devices for either forward or rearward driving.

14. In a transmission, drum means, a pair of friction bands surrounding said drum means, a pair of floating levers, the ends of one of said bands being connected to one lever and the ends of the other band having connection with the other lever, power driven means for bodily shifting said levers in a to and fro manner and at the same time for rocking said levers to alternately contract and release the bands, and means under control of the operator for rocking said levers independently of said power driven means.

15. In a transmission mechanism, two driving units each including a drum and a power driven intermittent grip device thereon, a pair of levers to be grasped by the operator and moved in the same direction or in reverse directions, and connections between said levers and said intermittent grip devices for setting the latter for forward or reverse driving according to the direction in which said levers are moved.

16. In a transmission mechanism, two driving units each including a drum and a power driven intermittent grip device thereon, a pair of levers to be grasped by the operator and moved in the same direction or in reverse directions, a tubular shaft extending from one lever, another shaft extending from the other lever through and beyond said tubular shaft, cams on the two shafts, and means controlled by said cams for setting the intermittent grip devices for forward or reverse driving.

17. In a transmission mechanism, two driving units each including a drum and a power driven intermittent grip device thereon, a pair of levers to be grasped by the operator and moved in the same direction or in reverse directions, a tubular shaft extending from one lever, another shaft extending from the other lever through and beyond said tubular shaft, cams on the two shafts, and spring arms having stirrups receiving said cams, said spring arms being connected with said intermittent grip devices to set them for forward or rearward driving.

18. In a transmission mechanism, two separate driving units for connection respectively with right and left hand traction members, each unit comprising a drum, an intermittent grip device thereon, a curved track transverse to and spaced from said drum, power-actuated toggle links connected with said grip device, and a shoe on the outermost of said toggle links slidably engaged with said curved track; and means for simultaneously moving the shoes of the two units oppositely along said tracks.

19. In a transmission mechanism, two separate driving units for connection respectively with right and left hand traction members, each unit comprising a drum, an intermittent grip device thereon, a curved track transverse to and spaced from said drum, power-actuated toggle links connected with said grip device, and a shoe on the outermost of said toggle links slidably engaged with said curved track; and means whereby the shoes of the two units may be simultaneously adjusted in the same direction along said curved tracks, or simultaneously adjusted in opposite directions along said tracks.

In testimony whereof I have hereunto set my hand.

SAMUEL STEPHEN MORTON.